(12) United States Patent
Gang et al.

(10) Patent No.: US 12,372,640 B2
(45) Date of Patent: Jul. 29, 2025

(54) METHOD FOR ESTIMATING AN INTRINSIC SPEED OF A VEHICLE

(71) Applicant: Valeo Schalter und Sensoren GmbH, Bietigheim-Bissingen (DE)

(72) Inventors: Li Gang, Bietigheim-Bissingen (DE); Youssef-Aziz Ghaly, Bietigheim-Bissingen (DE); Muneeb Imran, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 140 days.

(21) Appl. No.: 17/768,702

(22) PCT Filed: Oct. 15, 2020

(86) PCT No.: PCT/EP2020/079054
§ 371 (c)(1),
(2) Date: Apr. 13, 2022

(87) PCT Pub. No.: WO2021/074301
PCT Pub. Date: Apr. 22, 2021

(65) Prior Publication Data
US 2024/0134035 A1 Apr. 25, 2024

(30) Foreign Application Priority Data
Oct. 17, 2019 (DE) ............... 10 2019 128 020.6

(51) Int. Cl.
*G01S 13/60* (2006.01)
*G01S 13/42* (2006.01)
*G01S 13/931* (2020.01)

(52) U.S. Cl.
CPC ............ *G01S 13/60* (2013.01); *G01S 13/931* (2013.01); *G01S 2013/932* (2020.01)

(58) Field of Classification Search
CPC .. G01S 13/60; G01S 13/931; G01S 2013/932; G01S 13/343; G01S 13/589;
(Continued)

(56) References Cited

U.S. PATENT DOCUMENTS 9,983,301 B2    5/2018 Liu et al.
11,592,548 B2 * 2/2023 Kesaraju ............... G01S 13/589
(Continued)

FOREIGN PATENT DOCUMENTS

WO    2019/042523 A1    3/2019

OTHER PUBLICATIONS

D. Kellner et al.; "Instantaneous Ego-Motion Estimation using Doppler Radar;" 16th International IEEE Conference on Intelligent Transportation Systems (ITSC 2013); The Hague, Netherlands, Oct. 6-9, 2013; pp. 869-874; DOI: 10.1109/ITSC.2013.6728341 (6 pages).
(Continued)

*Primary Examiner* — Vladimir Magloire
*Assistant Examiner* — Remash R Guyah
(74) *Attorney, Agent, or Firm* — Osha Bergman Watanabe & Burton LLP

(57) ABSTRACT

The present invention refers to a method for estimating an intrinsic speed of a vehicle using a vehicle radar system with at least one radar sensor (4) for monitoring the surroundings of the vehicle (1), the method involving transmitting a radar signal via a transmission antenna of the radar sensor, receiving one or more reflected wave signals via a receiving antenna of the radar sensor, the reflected wave signals being the radar signal reflected by one or more objects, calculating an unambiguous Doppler velocity ($V_D$), wherein the unambiguous Doppler velocity ($V_D$) is calculated by the measured ambiguous Doppler velocity ($V_{D,CoG}$) and a Doppler hypothesis ($V_{DHypo}$), calculating a host-kinetic information ($\kappa$) of the vehicle (1) by using the unambiguous Doppler (Continued)

velocity ($V_D$), determining an estimation of the intrinsic speed of the vehicle from the host-kinetic information ($\kappa$).

16 Claims, 2 Drawing Sheets

(58) Field of Classification Search
CPC ...... G01S 13/726; G01S 13/42; G01S 13/584; G01S 7/295; G01S 13/723; G01S 13/58; G01S 13/66; G01S 13/72; G01S 2013/93271; G01S 2013/93273; G01S 13/92; G01S 13/874; G01S 2013/93274; G01S 13/9047; G01S 7/4026; G01S 7/4056; G01S 13/52; G01S 7/403; G01S 7/4091; G01S 13/93; B60T 2250/03; B60W 30/00
USPC ........ 342/104, 107, 109, 113–116, 127–129, 342/147, 158, 189; 701/1, 70, 93, 96, 701/300–302
See application file for complete search history.

(56) References Cited

U.S. PATENT DOCUMENTS

| | | | |
|---|---|---|---|
| 2011/0068970 A1* | 3/2011 | Mitsumoto | G01S 13/931 342/113 |
| 2016/0178742 A1* | 6/2016 | Shikatani | G01S 13/931 342/113 |
| 2016/0291143 A1* | 10/2016 | Cao | G01S 13/874 |
| 2017/0097410 A1* | 4/2017 | Liu | G01S 13/589 |
| 2020/0191936 A1* | 6/2020 | Witter | G01S 13/584 |
| 2020/0241124 A1* | 7/2020 | Fei | G01S 13/88 |
| 2020/0371228 A1* | 11/2020 | Wang | G01S 13/874 |

OTHER PUBLICATIONS

D. Kellner et al.; "Instantaneous Ego-Motion Estimation using Multiple Doppler Radars;" 2014 IEEE International Conference on Robotics and Automation (ICRA); Hong Kong, China; May 31, 2014; pp. 1592-1597; DOI: 10.1109/ICRA.2014.6907064 (6 pages).
International Search Report and Written Opinion in corresponding International Application No. PCT/EP2020/079054, mailed Dec. 4, 2020 (10 pages).

* cited by examiner

METHOD FOR ESTIMATING AN INTRINSIC SPEED OF A VEHICLE

The present invention relates generally to a method for estimating the intrinsic speed and/or the host-kinetic information of a vehicle, in particular by the Doppler radar principle. The present invention also refers to a system for estimating the intrinsic speed and/or the host-kinetic information of a vehicle. Furthermore, the present invention refers to an advanced driver assistance system for a vehicle and a computer program product.

In driver assistance systems for motor vehicles, for example, in ranging systems or collision warning systems, radar systems are used for sensing the surrounding field of traffic, in particular for locating the position of other traffic participants.

Radar systems may also be used to detect the range and velocity of nearby targets. With various advances in technology, radar systems may now be applied in many different applications. For example, automotive radar systems are seen as crucial to increasing road safety. Advanced driver assistance systems require radar systems with radar sensors that offer high-resolution as well as large unambiguous range, velocity and angle estimations.

Radar sensors for motor vehicles (automotive radar sensors) are already state of the art and are operated, for example, at a frequency of about 24 GHz or about 79 GHz. Radar sensors serve generally for the detection of target objects in the environment of the motor vehicle and assist the driver in numerous respects in connection with the driving of the motor vehicle.

Radar sensors measure the spacing between the target object and the vehicle. They also measure both the relative velocity with respect to the target object and also the so-called target angle, i.e. an angle between an imaginary connecting line leading to the target object and a reference line, for instance the longitudinal axis of the vehicle or a radar axis extending perpendicularly with respect to the front face of the sensor. With the aid of a radar sensor, the respectively current position of the target object relative to the vehicle can consequently be determined, and the target object can be tracked in the capture zone of the radar sensor, i.e. the relative position of the target object can be determined continuously over a plurality of measuring cycles of the radar sensor. Tracking is possible on the assumption that the points of reflection detected on the target object remain stable over the measuring cycles.

Existing radar systems are often based on the CW Doppler-technology. This means that the system continuously emits a radar wave (frequency f) which is partly reflected by an object with a frequency shift $\Delta f$ in compliance with the Doppler effect, which is proportional to the speed v of the vehicle ($\Delta f = 2$ fv/c c: velocity of light). The system determines v by measuring the frequency shift $\Delta f$. If, however, the radar wave is reflected by more than one object, the radar signal delivers no information which makes unambiguous assignment of the measured speed of the vehicle possible. This leads to Doppler ambiguities especially for lower speed of the vehicle.

From the scientific article "D. Kellner, M. Barjenbruch, J. Klappstein, J. Dickmann and K. Dietmayer, "Instantaneous ego-motion estimation using Doppler radar," 16th International IEEE Conference on Intelligent Transportation Systems (ITSC 2013), The Hague, 2013, pp. 869-874" a method for determining the velocity and yaw rate of the ego-vehicle by a self-contained algorithm is known. The algorithm is based on the received reflections (targets) of a single measurement cycle. It analyzes the distribution of their radial velocities over the azimuth angle.

From the scientific article "D. Kellner, M. Barjenbruch, J. Klappstein, J. Dickmann and K. Dietmayer, "Instantaneous ego-motion estimation using multiple Doppler radars," 2014 IEEE International Conference on Robotics and Automation (ICRA), Hong Kong, 2014, pp. 1592-1597" a method for determining the 2D motion state of an ego-vehicle (longitudinal, lateral velocity and yaw rate) by an algorithm using radar sensors is known. The method evaluates the relative motion between at least two Doppler radar sensors and their received stationary reflections (targets). Based on the distribution of their radial velocities across the azimuth angle, non-stationary targets and clutter are excluded. The ego-motion and its corresponding covariance matrix are estimated.

In US 2016/0178742 a radar apparatus mountable on a vehicle is disclosed, which transmits a radar signal, and includes a radio receiver that receives reflected wave signals being the radar signal reflected by multiple objects present in the viewing angle of the radar apparatus via a receiving antenna mountable on a side of the vehicle, a signal processing unit that determines the azimuths of the objects, the Doppler speeds between the radar apparatus and the objects, and the intensities of the reflected wave signals by using the reflected wave signals, and a radar state estimation unit that estimates the speed and traveling direction of the radar using the azimuths of the objects, the Doppler speeds, and the intensities.

However, in the methods known from the state of the art the ambiguity of radar measurements is not taken into account and used to determine the vehicle's own or intrinsic speed.

It is an object of the present invention to provide a method for improving the estimation of the vehicle's own or intrinsic speed by improving the calculation of the host-kinetic information of a vehicle.

This object is achieved by the independent claims. Advantageous embodiments are given in the dependent claims.

In particular, the present invention provides a method for estimating an intrinsic speed of a vehicle, in particular using a vehicle radar system with at least one radar sensor for monitoring the surroundings of the vehicle. In other words, a vehicle radar system with at least one radar sensor for monitoring the surroundings of the vehicle is provided. The surroundings of the vehicle can include one or more (target) objects.

The method comprises the following steps:
transmitting a radar signal via a transmission antenna of the radar sensor,
receiving one or more reflected wave signals via a receiving antenna of the radar sensor, the reflected wave signals being the radar signal reflected by one or more objects,
calculating an unambiguous Doppler velocity $V_D$, wherein the unambiguous Doppler velocity $V_D$ is calculated by the ambiguous measured Doppler velocity $V_{D,CoG}$ and a Doppler hypothesis $V_{DHypo}$,
calculating a host-kinetic information $\kappa$ of the vehicle by using the unambiguous Doppler velocity $V_D$,
determining an intrinsic speed, in particular an estimation of the intrinsic speed, of the vehicle from the host-kinetic information.

The basic idea of the invention is the calculation of an unambiguous Doppler velocity to avoid ambiguities which can otherwise occur. Using this unambiguous Doppler velocity the host-kinetic information can be calculated or better, and from that or based on that an (improved) estimation of the intrinsic speed of the vehicle can be determined. In this way a method for improving the estimation of the vehicle's own or intrinsic speed is provided.

According to a modified embodiment of the invention, the Doppler hypothesis $V_{DHypo}$ considers a yaw movement ω of the vehicle. The yaw movement ω can also be called yaw rate. The yaw movement ω can in particular be measured by at least one vehicle sensor (or sensor of the vehicle), in particular an odometry sensor(s) or sensor(s) used for odometry (for example a gyroscope, a yaw rate sensor or the like).

According to a modified embodiment of the invention, the Doppler hypothesis $V_{DHypo}$ considers a (intrinsic) speed $V_H$ of the vehicle. The (intrinsic) speed $V_H$ can in particular be measured by at least one vehicle sensor (or sensor of the vehicle), in particular an odometry sensor(s) or sensor(s) used for odometry (for example a wheel speed sensor(s) or the like). In this sense, the speed $V_H$ of the vehicle can also be called a measured speed or measured intrinsic speed of the vehicle, measured by a vehicle sensor. However, this measured (intrinsic) speed $V_H$ of the vehicle is not accurate enough and needs to be improved. In other words, this measured (intrinsic) speed $V_H$ of the vehicle is an initial estimation of the intrinsic speed of the vehicle, which needs to be improved, in particular by the method described herein.

According to a modified embodiment, the Doppler hypothesis or also called hypothetical unambiguous Doppler velocity $V_{DHypo}$ can for example be expressed as or can be calculated by the following formula:

$$V_{DHypo} = -V_H \cos\theta - \omega R \sin(\theta - \gamma)$$

According to a modified embodiment of the invention, by means of the reflected wave signals the radar sensor measures ambiguous Doppler velocity $V_{D,CoG}$ and azimuth angle θ. Additionally, by means of the reflected wave signals also a spacing or distance d between the object and the vehicle can be measured. In other words, the radar sensor measures an ambiguous Doppler velocity $V_{D,CoG}$ (or also called relative velocity) and an azimuth angle θ, and optionally additionally a distance to the object can be measured. The azimuth angle θ can be an angle between an imaginary connecting line leading to the target object and a reference line, for instance the longitudinal axis of the vehicle or a radar axis extending perpendicularly with respect to the front face of the sensor.

According to a modified embodiment of the invention, the unambiguous Doppler velocity $V_D$ (or the Doppler hypothesis $V_{DHypo}$) is calculated using the reflected wave signals (or information from the reflected wave signals, such as the measured azimuth angle, such as measured ambiguous Doppler velocity and measured azimuth angle), using information from at least one odometry sensor or sensors of the vehicle (such as speed and yaw movement of the vehicle), and using a position of the radar sensor in the vehicle (such as distance and/or angle between the radar sensor and the center of the rear axis).

According to another modified embodiment of the invention, the unambiguous Doppler velocity $V_D$ follows the following formula (or can be calculated by the following formula):

$$V_D = V_{D,CoG} + \left[ \frac{-V_H \cdot \cos\theta - \omega \cdot R \cdot \sin(\theta - \gamma) - V_{D,Max}/2}{V_{D,Max}} \right] \cdot V_{D,Max}$$

wherein:
- $V_D$ unambiguous Doppler velocity
- $V_{D,CoG}$ measured ambiguous Doppler velocity
- $V_{D,Max}$ maximal detectable Doppler velocity
- θ measured azimuth angle
- $V_H$ speed of the vehicle
- ω yaw movement of the vehicle
- R distance between the radar sensor and the center of the rear axis
- γ angle between the radar sensor and the center of the rear axis.

According to a modified embodiment of the invention, the step of calculating the host-kinetic information κ of the vehicle by using the unambiguous Doppler velocity $V_D$ also uses the reflected wave signals (or information from the reflected wave signals, such as the measured azimuth angle) and a position of the radar sensor in the vehicle (such as distance and angle between the radar sensor and the center of the rear axis).

According to a modified embodiment of the invention, the step of calculating the host-kinetic information κ of the vehicle by using the unambiguous Doppler velocity $V_D$ comprises the step of calculating the host-kinetic information κ by the following formula:

$$\kappa = \frac{1}{R} \frac{V_D}{\sin\gamma - \text{diag}(\cos\gamma) \cdot \tan\theta}$$

wherein:
- γ angle between the radar sensor and the center of the rear axis
- R distance between the radar sensor and the center of the rear axis
- $V_D$ unambiguous Doppler velocity
- θ measured azimuth angle.

According to a modified embodiment of the invention, the intrinsic speed or the estimation of the intrinsic speed $V_{H\ improved}$ of the vehicle is determined as the quotient of the yaw movement ω over the host-kinetic information κ.

According to a modified embodiment of the invention, the estimation of the intrinsic speed $V_{H\ improved}$ of the vehicle is performed having at least two detections, in particular of a static object (or infrastructure, in particular in the surroundings of the vehicle), based on the reflected wave signals. In particular, then number of (static) detections can be an integer number n. In particular the parameters or velocities described herein can be calculated or expressed for each (static) detection 1 to n, thus in particular yielding a vector.

According to a modified embodiment of the invention, the estimation of the intrinsic speed $V_{H\ improved}$ of the vehicle is performed using a maximum likelihood estimation, in particular using the unambiguous Doppler velocity $V_D$. The maximum likelihood estimation can for example be based on a comparison between a hypothetical Doppler velocity $V_{DHypo}$ (or also called Doppler hypothesis) and the (measured) unambiguous Doppler velocity $V_D$, thus $|V_{DHypo} - V_D|$. $V_D$ can be a list or vector of the unambiguous Doppler velocity for the or all static detections (or detections of a static object). The aim of the maximum likelihood estimation can in particular be to minimize an error $\text{GATE}_{MLE}$. In particular, the $\text{GATE}_{MLE}$ can be the error between the hypothetical Doppler velocity $V_{DHypo}$ and the (measured) unambiguous Doppler velocity $V_D$, thus $|V_{DHypo} - V_D|$. In other words, the maximum likelihood estimation can be to minimize the error $\text{GATE}_{MLE}$ which is $|V_{DHypo} - V_D|$. The result of the maximum likelihood estimation can in particular be the (improved) estimation of the intrinsic speed $V_{H\ improved}$. The Doppler Hypothesis or also called hypothetical unambiguous Doppler velocity $V_{DHypo}$ can for example be expressed as or can be calculated by the following formula:

$$V_{DHypo} = -V_H(\cos\theta - \kappa R \sin(\theta - \gamma)).$$

According to a modified embodiment of the invention, the intrinsic speed estimation for a certain detection $V_{HDetection}$ can for example be expressed as or can be calculated by the following formula:

$$V_{HDetection} = \frac{V_D}{\cos\theta(-1 + \kappa R(\sin\gamma - \cos\gamma\tan\theta))}.$$

According to a modified embodiment of the invention, there can be the step of determining an estimation of the intrinsic yaw movement $\omega_{improved}$ of the vehicle from the host-kinetic information $\kappa$, and in particular also from or based on the estimation of the intrinsic speed $V_{H\ improved}$. This can in particular also be part of the maximum likelihood estimation. The maximum likelihood estimation can be used to estimate both the intrinsic speed $V_{H\ improved}$ and the intrinsic yaw movement $\omega_{improved}$. In particular the (improved) intrinsic yaw movement $\omega_{improved}$ can be calculated as the multiplication of the host-kinetic information $\kappa$ times the (improved) intrinsic speed $V_{H\ improved}$.

The present invention also provides a system for estimating an intrinsic speed of a vehicle, the system comprising at least one radar system. The system further comprises at least a computer-based evaluation device. The evaluation device is set up or adapted for processing the reflected wave signals and/or doppler measurements from the radar system to determine an intrinsic speed of a vehicle as previously described, in particular according to the method as previously described. In particular, the radar system can be adapted to or designed for transmitting the radar signal via a transmission antenna of the radar sensor, and receiving one or more reflected wave signals via a receiving antenna of the radar sensor, the reflected wave signals being the radar signal reflected by one or more objects. In particular, the computer-based evaluation device can be adapted to or designed for carrying out the other calculation and/or determination steps described above.

According to a modified embodiment of the invention, the computer-based evaluation device is or is part of an (advanced) driver assistance system of the vehicle.

The present invention also provides a computer program product comprising instructions which, when executed by a computer, cause the computer to carry out the method as previously described. In particular, the other calculation and/or determination steps described above, other than the transmitting and receiving of radar signals performed by the radar system, can be carried out by the computer program product.

These and other aspects of the invention will be apparent from and elucidated with reference to the embodiments described hereinafter. Individual features disclosed in the embodiments con constitute alone or in combination an aspect of the present invention. Features of the different embodiments can be carried over from one embodiment to another embodiment.

In the drawings:

In FIG. 1 the geometrical dependency between a radar Doppler-measurement and the host-kinetic information of a vehicle are shown.

Figure 1:
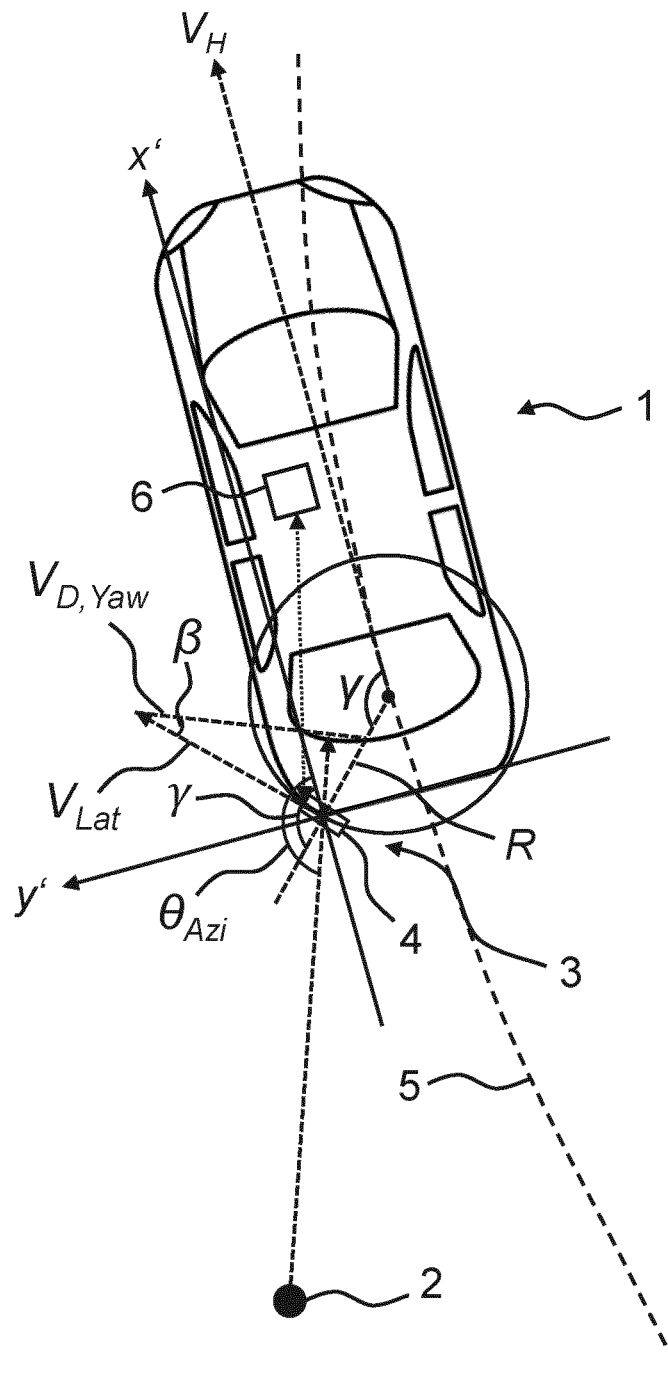
FIG. 1 shows a schematic top view of a vehicle according to an embodiment of the invention.

The vehicle drives along a track 5 and measures nearby objects or object 2 with a radar system 3. The radar system 3 includes at least one radar sensor 4 for monitoring the surroundings of the vehicle. FIG. 1 shows that the radar sensor 4 is located at the rear of the vehicle 1 and is mounted at the vehicle at the position $x_{Sensor}$, $y_{Sensor}$. In polar coordinates the radar sensor position can be represented by the distance R between the radar sensor and the center of the rear axis and the angle $\gamma$ between the radar sensor and the center of the rear axis. In other words, the Cartesian coordinates $x_{Sensor}$ and $y_{Sensor}$ directly translate into the polar coordinates R and $\gamma$ in the known manner, and vice versa.

A radar sensor or radar sensors measures or measure the spacing or distance d between the target object 2 and the vehicle 1. The radar sensor or radar sensors also measures or measure both the relative velocity, or ambiguous Doppler velocity $V_{D,CoG}$, with respect to the target object 2 and also the so-called target angle, or azimuth angle $\theta$, i.e. an angle between an imaginary connecting line leading to the target object 2 and a reference line, for instance the longitudinal axis of the vehicle 1 or a radar axis extending perpendicularly with respect to the front face of the radar sensor 3. With the aid of a radar sensor, the respectively current position of the target object 2 relative to the vehicle 1 can consequently be determined, and the target object 2 can be tracked in the capture zone of the radar sensor, i.e. the relative position of the target object 2 can be determined continuously over a plurality of measuring cycles of the radar sensor.

Referring to FIG. 1, the lateral velocity of the vehicle is measured by the following formula:

$$V_{Lat} = -\omega \cdot R \quad (1)$$

wherein:

$$R = \sqrt{x_{Sensor}^2 + y_{Sensor}^2} \quad (2)$$

and $x_{Sensor}$, $y_{Sensor}$ is the position of the radar sensor at the vehicle. With reference to FIG. 1 the trigonometry of lateral velocity can be calculated as follows:

$$\beta = \theta_{Azi} - \gamma \quad (3)$$

wherein $\theta_{Azi}$ (also referred to as $\theta$) is the azimuth angle and $$\gamma = \arctan 2(y_{Sensor}, x_{Sensor}). \quad (4)$$

The Doppler component from the yaw rate can be calculated as follows:

$$V_{D,Yaw} = V_{Lat} \cdot \sin\beta \quad (5)$$

Replacing $V_{Lat}$ by formula (1) and (3) results in the following formula:

$$V_{D,Yaw} = -\omega \cdot R \cdot \sin(\theta_{Azi} - \gamma) = V_D \quad (6)$$

The basic idea of host-speed estimation $V_H$ can be expressed as:

$$v_D = -V_H \cdot \cos\theta \rightarrow V_H = -\frac{v_D}{\cos\theta} \quad (7)$$

$$V_D = -V_H \cos\theta - \omega R i \sin(\Theta - \gamma) \quad (8)$$

The host-kinetic information can be solved, if more than two static detections (or detections of a static object (or infrastructure) in the surroundings of the vehicle) with different direction-of-arrival (DOA) or angles θ exist:

$$f(\theta) = \underbrace{\frac{v_D(\theta)}{V_H \cdot \cos\theta} + 1}_{\text{host-kinetic}} = \underbrace{\frac{\omega}{V_H}}_{\text{const}} \cdot \underbrace{R}_{\text{const}} \cdot \left(\sin\underbrace{\gamma}_{\text{const}} - \cos\underbrace{\gamma}_{\text{const}} \tan\underbrace{\theta}_{\text{DOA}}\right) \Rightarrow f(\theta) = \quad (9)$$

$$\kappa \cdot R \cdot (\sin\gamma - \cos\gamma\tan\theta)$$

In this way, the host-kinetic information κ is a multiplication coefficient of a tangent function. Now using the vector of the Doppler velocity $V_D = [v_{D1}, v_{D2}, \ldots, v_{Dn}]^T$ and the vector of the (azimuth) angles $\theta = [\theta_1, \theta_2, \ldots, \theta_n]^T$ to represent the radar measurement of the whole or all (static) detections n, i.e., Doppler velocity and azimuth angle:

$$V_D = R \cdot (\sin\gamma - \text{diag}(\cos\gamma) \cdot \tan\theta) \cdot \kappa \quad (10)$$

The numeric solution of the host-kinetic information κ can be estimated via the formula:

$$\kappa = \frac{1}{R} \cdot \frac{V_D}{\sin\gamma - \text{diag}(\cos\gamma) \cdot \tan\theta} \quad (11)$$

Because the maximal detectable Doppler velocity $V_{D,max}$ (of e.g. a Chirp sequence-FMCW radar concept) is limited, the measured Doppler velocity $V_{D,CoG}$ is ambiguous:

$$V_{D,CoG} = V_D - \left\lceil \frac{V_D - V_{D,Max}/2}{V_{D,Max}} \right\rceil \cdot V_{D,Max} \quad (12)$$

where $\lceil \cdot \rceil$ represents the ceil function and $V_{D,max}$ is the maximal detectable Doppler velocity, which depends on the radar sensor chirp-duration which raises the various sample frequency in Doppler domain between different beam and major cycle (MC).

$V_D$ from formula 8 is now inserted and the formula 12 is now converted to $V_D$ which gives us the following formula:

$$V_D = V_{D,CoG} + \left\lceil \frac{-V_H \cdot \cos\theta - \omega \cdot R \cdot \sin(\theta - \gamma) - V_{D,Max}/2}{V_{D,Max}} \right\rceil \cdot V_{D,Max}. \quad (13)$$

With $V_D$ the host-kinetic information κ can be calculated according to formula (11). As shown in formula (9), the host-kinetic information κ can be the quotient of yaw movement ω over the speed $V_H$. Therefore, the intrinsic speed or the (improved) estimation of the intrinsic speed can be determined by the quotient of the yaw movement ω over the host-kinetic information κ.

In one embodiment, the estimation of the intrinsic speed $V_{H\ improved}$ of the vehicle is performed having at least two detections of a static object (or also called infrastructure) in the surroundings of the vehicle. These at least two detections of a static object (also referred to as static detections) are based on or derived from the reflected wave signals. For example, the at least two detections of a static object can be classified or derived using formula (9).

In this embodiment, the estimation of the intrinsic speed $V_{H\ improved}$ of the vehicle can be performed using a maximum likelihood estimation, in particular using the unambiguous Doppler velocity $V_D$. The aim of the maximum likelihood estimation is to minimize the error $GATE_{MLE}$. The maximum likelihood estimation can for example be based on a comparison between a hypothetical Doppler velocity $V_{DHypo}$ and the measured unambiguous Doppler velocity $V_D$, thus $|V_{DHypo} - V_D|$. Here $V_D$ can be the list or vector of the unambiguous Doppler velocity for all static detections. In particular, the $GATE_{MLE}$ can be the error between the hypothetical Doppler velocity $V_{DHypo}$ and the measured unambiguous Doppler velocity $V_D$, thus $|V_{DHypo} - V_D|$. In other words, the maximum likelihood estimation is to minimize the error $GATE_{MLE}$ which is $|V_{DHypo} - V_D|$.

From formula (8) the (hypothetical) unambiguous Doppler velocity $V_{DHypo}$ can be expressed as:

$$V_{DHypo} = -V_H(\cos\theta - \kappa R \sin(\theta - \gamma)) \quad (14).$$

Furthermore, from formula (9) the host-speed estimation for a certain detection $V_{HDetection}$ can be expressed as:

$$V_{HDetection} = \frac{V_D}{\cos\theta(-1 + \kappa R(\sin\gamma - \cos\gamma\tan\theta))}. \quad (15)$$

The result of the maximum likelihood estimation is the estimation of the intrinsic speed $V_{H\ improved}$. Furthermore, also the (improved) intrinsic yaw movement $\omega_{improved}$ of the vehicle can be estimated from the host-kinetic information κ. This can in particular also be part of the maximum likelihood estimation. In particular the (improved) intrinsic yaw movement $\omega_{improved}$ can be calculated as the multiplication of the host-kinetic information κ times the (improved) intrinsic speed $V_{H\ improved}$.

The method can in one embodiment exemplary also be explained based on the following pseudo code. It uses the maximum likelihood estimation and is based on the comparison between a hypothetical Doppler velocity $V_{DHypo}$ and the measured unambiguous Doppler velocity $V_D$, thus $|V_{DHypo} - V_D|$, as explained above (bold letters indicating a vector). $Detection_{Infrastructure}$ corresponds to a detection of an infrastructure or static object in the surroundings of the vehicle based on the reflected wave signals. Moving targets are not considered due to the additional unknown Doppler component. The infrastructure detections $Detection_{Infrastructure}$ can for example be classified using formula (9). The pseudo code of this embodiment can exemplary be the following:

////////////////////// Start-Line //////////////////////
$Detection_{Infrastructure} := \{f(\Theta_i) < \text{Gate} ; i = 1, 2, \ldots, n \text{ (number of detections)}\}$ formula (9)
Calculate $V_D$ based on formula (13)
Calculate κ based on formula (11)
Initial $Gate_{MLE} := \text{const.}$
for i = from 1 to n
  for j = from 1 to n
    if i ≠ j
      $\{V_{HDetection,i}, V_{HDetection,j}\} := $ estimate speed based on formula (15)
      $\{V_{DHypo,i}, V_{DHypo,j}\} := $ estimate hypothetical unambiguous Doppler velocity based on formula (14)
      if sum $(|V_{DHypo,i} - V_D|) > Gate_{MLE}$
        $V_{H\ improved} := V_{HDetection,i}$
        $\omega_{improved} := \kappa V_{HDetection,i}$
        $Gate_{MLE} = \text{sum}(|V_{DHypo,i} - V_D|)$
      end
      if sum $(|V_{DHypo,j} - V_D|) > Gate_{MLE}$
        $V_{H\ improved} := V_{HDetection,j}$
        $\omega_{improved} := \kappa V_{HDetection,j}$ -continued

```
    Gate_MLE = sum (|V_DHypo,j − V_D|)
      end
    end
  end
end
//////////////////// End-Line ////////////////////
```

Figure 2:
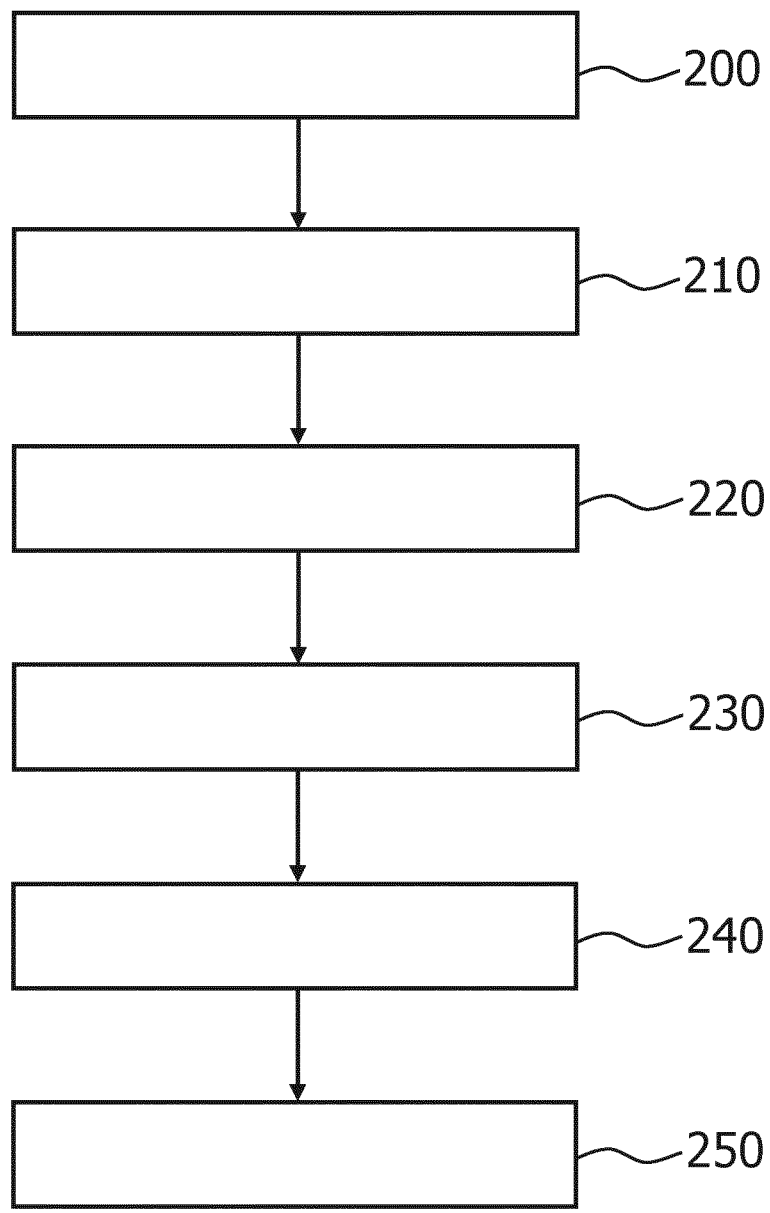
FIG. 2 shows a flowchart of a method for estimating an intrinsic speed of a vehicle according to an embodiment of the invention.

FIG. 2 shows a flowchart of a method for estimating an intrinsic speed of a vehicle according to an embodiment of the invention. The method starts with step 200. In step 200 a vehicle radar system 3 with at least one radar sensor 4 for monitoring the surroundings of the vehicle 1 can be provided. However, step 200 can alternatively also be regarded to be an initialization step of the method for estimating an intrinsic speed of a vehicle, using a vehicle radar system 3 with at least one radar sensor 4 for monitoring the surroundings of the vehicle 1.

In step 210 a radar signal via a transmission antenna of the radar sensor 4 is transmitted and in step 220 one or more reflected wave signals are received via a receiving antenna of the radar sensor 4, wherein the reflected wave signals are the radar signal reflected by one or more objects 2. By means of the reflected wave signals the radar sensor can in particular measure the ambiguous Doppler velocity $V_{D,CoG}$ and the azimuth angle θ.

From or using the reflected radar signals, an unambiguous Doppler velocity $V_D$ is calculated in step 230. The unambiguous Doppler velocity $V_D$ is calculated by or by using the measured ambiguous Doppler velocity $V_{D,CoG}$ and a Doppler hypothesis $V_{DHypo}$. The Doppler hypothesis $V_{DHypo}$ can in particular consider a yaw movement ω of the vehicle 1, which can in particular be measured by at least one vehicle (odometry) sensor or sensors (e.g. gyroscope, a yaw rate sensor or the like) of the vehicle 1. The Doppler hypothesis $V_{DHypo}$ can in particular also consider a speed $V_H$ of the vehicle 1, which can in particular also be measured by at least one vehicle (odometry) sensor or sensors (e.g. wheel speed sensor(s) or the like) of the vehicle 1. Thus, the unambiguous Doppler velocity $V_D$ can in particular be calculated using the reflected wave signals (or information from the reflected wave signals, such as the measured azimuth angle, such as measured ambiguous Doppler velocity and measured azimuth angle), using information from at least one odometry sensor or sensors of the vehicle (such as speed and yaw movement of the vehicle), and using a position of the radar sensor in the vehicle (such as distance and angle between the radar sensor and the center of the rear axis).

In step 240 the host-kinetic information κ of the vehicle 1 is calculated by using the unambiguous Doppler velocity $V_D$. In particular in this step also the reflected wave signals (or information from the reflected wave signals, such as the measured azimuth angle) and a position of the radar sensor in the vehicle can be used (such as distance and angle between the radar sensor and the center of the rear axis).

In step 250 the intrinsic speed or (improved) estimation of the intrinsic speed $V_{H\ improved}$ of the vehicle 1 is determined from the host-kinetic information κ. In particular the intrinsic speed or (improved) estimation of the intrinsic speed $V_{H\ improved}$ can be determined by the quotient of the yaw movement ω over the host-kinetic information κ.

In one embodiment the estimation of the intrinsic speed $V_{H\ improved}$ of the vehicle is performed having at least two detections of a static object, based on or derived from the reflected wave signals. The estimation of the intrinsic speed $V_{H\ improved}$ of the vehicle can be performed using a maximum likelihood estimation (as explained above), in particular using the unambiguous Doppler velocity $V_D$. Furthermore, there can be the step of determining an estimation of the intrinsic yaw movement $ω_{improved}$ of the vehicle from the host-kinetic information κ. This can in particular also be part of the maximum likelihood estimation. In other words, the maximum likelihood estimation can be used to estimate both the intrinsic speed $V_{H\ improved}$ and the intrinsic yaw movement $ω_{improved}$. In particular the (improved) intrinsic yaw movement $ω_{improved}$ can be calculated as the multiplication of the host-kinetic information κ times the (improved) intrinsic speed $V_{H\ improved}$.

REFERENCE SIGNS LIST 1 vehicle
2 object
3 radar system
4 radar sensor
5 track
6 computer-based evaluation device
κ host-kinetic information
$x_{Sensor}$ radar sensor mounting x-position
$y_{Sensor}$ radar sensor mounting y-position
γ angle between the radar sensor and the center of the rear axis
R distance between the radar sensor and the center of the rear axis
ω yaw movement of the vehicle
$V_H$ speed of the vehicle
d distance
θ azimuth angle
$V_{Lat}$ lateral velocity
$V_{D,Yaw}$ doppler component from yaw rate
$V_{D,CoG}$ measured ambiguous Doppler velocity
$V_D$ unambiguous Doppler velocity
$V_{DHypo}$ Doppler hypothesis
$V_{D,max}$ maximal detectable Doppler velocity
$V_{H,\ improved}$ estimation of intrinsic speed of the vehicle
200 step 200
210 step 210
220 step 220
230 step 230
240 step 240
250 step 250

The invention claimed is:

1. A method for estimating an intrinsic speed of a vehicle using a vehicle radar system with at least one radar sensor for monitoring the surroundings of the vehicle, the method comprising:
   transmitting a radar signal via a transmission antenna of the radar sensor;
   receiving one or more reflected wave signals via a receiving antenna of the radar sensor, the reflected wave signals being the radar signal reflected by one or more objects;
   determining an ambiguous Doppler velocity and a Doppler hypothesis based on the reflected wave signals;
   calculating an unambiguous Doppler velocity, wherein the unambiguous Doppler velocity is calculated based on the ambiguous Doppler velocity and the Doppler hypothesis;
   calculating a host-kinetic information of the vehicle based on the unambiguous Doppler velocity; and determining an estimation of the intrinsic speed of the vehicle based on the host-kinetic information and the unambiguous Doppler velocity, wherein the estimation of the intrinsic speed of the vehicle is performed using a maximum likelihood estimation, and wherein the maximum likelihood estimation is based on a difference between the Doppler hypothesis and the unambiguous Doppler velocity.

2. The method according to claim 1, wherein the Doppler hypothesis considers a yaw movement of the vehicle.

3. The method according to claim 1, wherein the Doppler hypothesis considers a speed of the vehicle.

4. The method according to claim 2,
wherein the yaw movement is measured by at least one vehicle sensor of the vehicle, and
wherein the at least one vehicle sensor of the vehicle is an odometry sensor.

5. The method according to claim 4, wherein by means of the reflected wave signals the radar sensor measures the ambiguous Doppler velocity and an azimuth angle.

6. The method according to claim 5, wherein the unambiguous Doppler velocity is calculated using the reflected wave signals, using information from at least one odometry sensor of the vehicle, and using a position of the radar sensor in the vehicle.

7. The method according to claim 1, wherein the unambiguous Doppler velocity follows the following formula:

$$V_D = V_{D,CoG} + \left[ \frac{-V_H \cdot \cos\theta - \omega \cdot R \cdot \sin(\theta - \gamma) - V_{D,Max}/2}{V_{D,Max}} \right] \cdot V_{D,Max}$$

wherein:
$V_D$ unambiguous Doppler velocity
$V_{D,CoG}$ measured ambiguous Doppler velocity
$V_{D,Max}$ maximal detectable Doppler velocity
$\theta$ measured azimuth angle
$V_H$ speed of the vehicle
$\omega$ yaw movement of the vehicle
R distance between the radar sensor and the center of the rear axis
$\gamma$ angle between the radar sensor and the center of the rear axis.

8. The method according to claim 7, wherein calculating the host-kinetic information of the vehicle by using the unambiguous Doppler velocity also uses the reflected wave signals and a position of the radar sensor in the vehicle.

9. The method according to claim 8, wherein calculating the host-kinetic information of the vehicle by using the unambiguous Doppler velocity comprises the step of calculating the host-kinetic information by the following formula:

$$\kappa = \frac{1}{R} \frac{V_D}{\sin\gamma - \text{diag}(\cos\gamma) \cdot \tan\theta}$$

wherein:
$\gamma$ angle between the radar sensor and the center of the rear axis
R distance between the radar sensor and the center of the rear axis
$V_D$ unambiguous Doppler velocity
$\theta$ measured azimuth angle.

10. The method according to claim 1, wherein the estimation of the intrinsic speed of the vehicle is determined as a quotient of a yaw movement over the host-kinetic information.

11. The method according to claim 1, wherein the estimation of the intrinsic speed of the vehicle is performed having at least two detections of a static object, based on the reflected wave signals.

12. The method according to claim 1, further comprising determining an estimation of an intrinsic yaw movement of the vehicle from the host-kinetic information.

13. The method according to claim 1, wherein the ambiguous Doppler velocity is limited by a maximal detectable Doppler velocity.

14. The method according to claim 1, further comprising:
determining an intrinsic yaw movement of the vehicle using a maximum likelihood estimation.

15. A system for estimating an intrinsic speed of a vehicle, the system comprising:
at least one radar system;
at least a computer-based evaluation device, wherein the evaluation device is set up for processing the reflected wave signals and/or doppler measurements from the radar system to determine the intrinsic speed of the vehicle according to the method of claim 1.

16. The system according to claim 15, wherein the computer-based evaluation device is or is part of an advanced driver assistance system of the vehicle.

* * * * *